US010012299B2

(12) United States Patent
Cooper et al.

(10) Patent No.: US 10,012,299 B2
(45) Date of Patent: Jul. 3, 2018

(54) INTEGRATED ACTIVE LIMITED SLIP DIFFERENTIAL

(71) Applicant: DANA AUTOMOTIVE SYSTEMS GROUP, LLC, Maumee, OH (US)

(72) Inventors: Kenneth E. Cooper, Toledo, OH (US); Thomas L. Nahrwold, Napoleon, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 13 days.

(21) Appl. No.: 15/290,574

(22) Filed: Oct. 11, 2016

(65) Prior Publication Data
US 2017/0108103 A1  Apr. 20, 2017

Related U.S. Application Data

(60) Provisional application No. 62/241,249, filed on Oct. 14, 2015.

(51) Int. Cl.
*F16H 48/22*  (2006.01)
*F16H 48/36*  (2012.01)
(Continued)

(52) U.S. Cl.
CPC ......... *F16H 48/22* (2013.01); *F16H 37/0813* (2013.01); *F16H 48/08* (2013.01); *F16H 48/36* (2013.01); *F16H 48/40* (2013.01); *F16H 57/0423* (2013.01); *F16H 57/0483* (2013.01); *F16H 48/34* (2013.01);
(Continued)

(58) Field of Classification Search
None
See application file for complete search history.

(56) References Cited

U.S. PATENT DOCUMENTS 4,283,963 A * 8/1981 Hickey .................. F16C 19/54
475/246
4,950,214 A * 8/1990 Botterill ................. F16D 28/00
475/231
(Continued)

FOREIGN PATENT DOCUMENTS

DE   4111296 A1   10/1992
EP   0368140 A2   5/1990

OTHER PUBLICATIONS

Extended European Search Report for EP Application No. 16193815.4 dated Apr. 4, 2017.

*Primary Examiner* — Justin Holmes
(74) *Attorney, Agent, or Firm* — Marshall & Melhorn, LLC

(57) ABSTRACT

A limited slip differential system having a differential housing, a differential case disposed within the differential housing and a differential gear set supported within the differential case. A friction clutch assembly including a clutch pack is positioned within the differential case and axially adjacent the differential gear set. A ball and ramp assembly is positioned outside the differential case and includes a reaction member positioned within and fixed to the differential housing. A differential bearing is positioned axially between the reaction member and the differential housing and radially outward from the differential case. A singular thrust bearing is located within the differential housing and outside the differential case and applies an axial load from the actuator assembly to the clutch pack.

14 Claims, 2 Drawing Sheets

(51) Int. Cl.
  *F16H 37/08* (2006.01)
  *F16H 48/08* (2006.01)
  *F16H 48/40* (2012.01)
  *F16H 57/04* (2010.01)
  *F16H 48/34* (2012.01)

(52) U.S. Cl.
  CPC .. *F16H 2048/343* (2013.01); *F16H 2048/364* (2013.01); *F16H 2048/405* (2013.01)

(56) References Cited

U.S. PATENT DOCUMENTS

| | | | |
|---|---|---|---|
| 5,106,349 A | 4/1992 | Botterill et al. | |
| 5,733,049 A * | 3/1998 | Shimmell | B22D 15/02 384/434 |
| 6,296,590 B1 | 10/2001 | Gassmann | |
| 6,398,686 B1 | 6/2002 | Irwin | |
| 6,413,182 B1 | 7/2002 | Yates, III et al. | |
| 6,460,677 B1 | 10/2002 | Roscoe | |
| 6,471,406 B1 * | 10/2002 | Cadle | B22F 5/00 384/433 |
| 6,478,708 B2 | 11/2002 | Krisher | |
| 6,533,090 B2 * | 3/2003 | Osborn | F16H 48/34 192/48.2 |
| 6,561,939 B1 | 5/2003 | Knapke | |
| 6,579,204 B2 | 6/2003 | Brown et al. | |
| 6,592,487 B2 | 7/2003 | Gassmann | |
| 6,827,663 B2 | 12/2004 | Tucker-Peake | |
| 6,948,604 B2 | 9/2005 | Puiu | |
| 6,971,494 B2 | 12/2005 | Puiu | |
| 6,991,079 B2 | 1/2006 | Puiu | |
| 7,001,303 B1 | 2/2006 | Peura | |
| 7,004,873 B2 | 2/2006 | Puiu | |
| 7,201,264 B2 | 4/2007 | Puiu | |
| 7,337,886 B2 | 3/2008 | Puiu | |
| 7,357,748 B2 | 4/2008 | Kelley, Jr. | |
| 7,585,246 B2 | 9/2009 | Chludek | |
| 7,717,818 B2 | 5/2010 | Suzuki et al. | |
| 7,846,056 B2 | 12/2010 | Chludek et al. | |
| 8,256,593 B2 | 9/2012 | Kato et al. | |
| 8,287,417 B2 | 10/2012 | Sudou et al. | |
| 8,597,150 B1 | 12/2013 | Downs et al. | |
| 8,771,128 B2 | 7/2014 | Ekonen et al. | |
| 8,771,129 B2 | 7/2014 | Bradford, Jr. | |
| 9,003,925 B2 | 4/2015 | Corliss et al. | |
| 9,005,070 B2 | 4/2015 | Hoffmann et al. | |
| 9,028,358 B2 | 5/2015 | Valente et al. | |
| 9,302,581 B1 | 4/2016 | Valente | |
| 9,453,568 B2 | 9/2016 | Anetzberger et al. | |
| 2008/0227581 A1 * | 9/2008 | Catalano | B60B 35/16 475/220 |
| 2009/0048055 A1 * | 2/2009 | Corless | F16H 48/08 475/230 |
| 2015/0211619 A1 | 7/2015 | Cooper | |
| 2017/0089439 A1 | 3/2017 | Monticello | |
| 2017/0130814 A1 | 5/2017 | Wang et al. | |
| 2017/0144542 A1 | 5/2017 | Pump | |

* cited by examiner

INTEGRATED ACTIVE LIMITED SLIP DIFFERENTIAL

CROSS-REFERENCE TO RELATED APPLICATIONS

This application is claiming the benefit, under 35 U.S.C. 119(e), of the provisional application granted Ser. No. 62/241,249 filed on Oct. 14, 2015 the entire disclosure of which is hereby incorporated by reference.

FIELD

The present disclosure is related to a limited slip differential for a motor vehicle and, more particularly, to a limited slip differential having a thrust load being reacted through a differential bearing positioned outside a differential case.

BACKGROUND

Differentials are well-known in the prior art and are arranged in a power transmission system of a motor vehicle to allow a pair of output shafts operatively coupled to an input shaft to rotate at different speeds and distribute the torque provided by the input shaft between the output shafts. The differential operates to improve vehicle mobility and stability.

Limited slip differentials facilitate a reduction of, or an elimination of, a differential function present in a vehicle driveline. By engaging a clutch or otherwise drivingly engaging an output shaft of the motor vehicle with a remaining output shaft or a housing of the differential, the differential function can be reduced or eliminated. Such functionality may be used to increase traction in reduced friction environments or to facilitate a variety of operations which may be performed to increase control of the motor vehicle.

Limited slip differentials use a friction clutch assembly or clutch positioned between a side gear and a differential case to selectively reduce or eliminate the differential function. The differentials often include additional components including a plurality of bearings which support the differential case and gears and actuator assemblies. The additional components can increase the cost and complexity of the limited slip differential and the motor vehicle. Therefore, there is a need for a less complex limited slip differential that lower costs and increases stability of the motor vehicle.

SUMMARY

A limited slip differential system having a differential housing, a differential case that rotates within the differential housing and a differential gear set supported within the differential case and connected to two axle half shafts. A friction clutch assembly including a clutch pack is positioned within the differential case and axially adjacent the differential gear set. A ball and ramp assembly is positioned outside the differential case and includes a reaction member, an actuating ring and a plurality of balls positioned between the reaction member and actuating ring. The reaction member is positioned within and fixed to the differential housing. A differential bearing is positioned axially between the reaction member and the differential housing and radially outward from the differential case. The differential bearing includes a roller and an outer race. A singular thrust bearing is located within the differential housing and outside the differential case axially adjacent the actuating ring. The thrust bearing is in direct contact with thrust pins that extend through the differential case and axially abut the clutch pack.

BRIEF DESCRIPTION OF DRAWINGS

The above, as well as other advantages of the present embodiments, will become readily apparent to those skilled in the art from the following detailed description when considered in the light of the accompanying drawings in which.

DETAILED DESCRIPTION OF THE PREFERRED EMBODIMENTS

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions, orientations or other physical characteristics relating to the embodiments disclosed are not to be considered as limiting, unless expressly stated otherwise.

Figure 1:
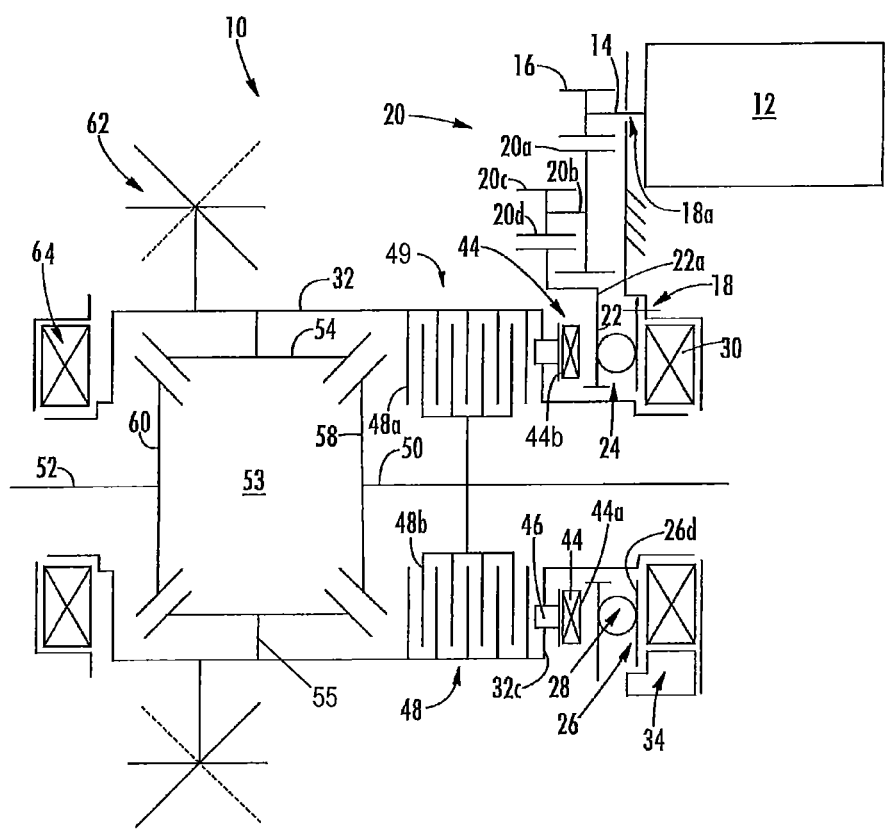
FIG. 1 is a schematic top view of a preferred embodiment of an integrated active limited slip differential system.

As shown in FIG. 1, an integrated active limited slip differential system 10 is provided for a motor vehicle. The system 10 includes an actuator 12 provided with a rotatable output shaft 14 connected thereto and a first gear 16 rotatably supported on the end of the output shaft 14. The actuator 12 may be, but is not limited to, a reversible electric actuator motor as it is compact and easily controllable. It will be appreciated that any other appropriate type of actuator may be used including, but not limited to, a hydraulic or pneumatic actuator.

In one embodiment, the actuator 12 is positioned outside of a differential housing 18. The actuator 12 may be mounted directly to the differential housing 18 as shown in FIG. 1. It is also permissible for the actuator 12 to be mounted to another structure in the motor vehicle. When the actuator 12 is positioned outside the differential housing 18, the output shaft 14 extends from the actuator 12 through the differential housing 18. In one embodiment, the output shaft 14 can extend through an aperture 18a in the differential housing 18 and connects to the first gear 16.

The first gear 16 is directly connected to a reduction gear set 20. In one embodiment, as shown in FIG. 1, the reduction gear set 20 includes the first reducing gear 20a mounted on a reducing gear shaft 20b. A second reducing gear 20c is mounted on the reducing gear shaft 20b. The second reducing gear 20c is meshed with a third reducing gear 20d. The first gear 16 is meshed with a first reducing gear 20a of the reduction gear set 20. FIG. 1 depicts one layout of the reduction gear set 20 with three reducing gears; however, the number of reducing gears and the layout of the reducing gears may vary within the differential housing.

The third reducing gear 20d is in driving engagement with an actuating ring 22 (also known as a pressure plate) of a ball and ramp assembly 24. More preferably, the actuating ring 22 has a set of teeth on an outer radial surface that engages with teeth on the radially outer surface of the third reducing gear 20d. The teeth of the actuating ring 22 circumferentially extend from a peripheral edge of the actuating ring 22. The teeth of the actuating ring 22 may cover the full circumference of the actuating ring 22 or a portion of the circumference. The rotation of the actuator 12 drives the first gear 16, which rotates the first reducing gear 20a, which rotates the second reducing gear 20c, which rotates the third reducing gear 20d. The teeth of the third reducing gear 20d are meshingly engaged with the teeth of the actuating ring 22, thus rotating the actuating ring 22.

The ball and ramp assembly 24 is driven by the actuator 12 via the reduction gear set 20. The ball and ramp assembly 24 includes a reaction member 26 and a plurality of balls or rollers 28 between the reaction member 26 and the actuating ring 22. The reaction member 26 has an annular surface 26d facing an annular surface 22a of the actuating ring 22. The reaction member annular face 26d may have a first set of circumferentially extending grooves (not shown) of varying axial depth. The actuating ring annular face 22a has a second set of circumferentially extending grooves (not shown) of varying axial depth aligned with the first set of grooves. At least one ball or roller 28 is located in each groove of the sets to facilitate rotation of the actuating ring 22 with respect to the reaction member 26.

The reaction member 26 resists an axial force applied thereto causing the actuating ring 22 to apply a force to a thrust bearing 44 located adjacent thereto. The reaction member 26 is fixed to the differential housing 18 to prevent rotation of the reaction member 26. Fixing the reaction member 26 to the differential housing 18 enables it to resist an axial force applied thereto. As the ball and ramp assembly 24 expands to axially displace the reaction member 26, the force reacts through a thrust member 46 and ultimately to a friction clutch assembly 48.

Although a ball and ramp assembly 24 has been described above, other mechanisms can be used to provide axial thrust in response to rotational movement. For example, a cammed disc arrangement or cam-follower arrangement could alternatively be used.

A first differential bearing 30 may be axially located between the reaction member 26 and the differential housing 18. The first differential bearing 30 is located radially outward from the differential case 32. The first differential bearing 30 does not facilitate rotation of the reaction member 26, but rather facilitates rotation between a differential case 32 and the differential housing 18. In one embodiment, the differential housing 18 is located radially outward from the first differential bearing 30 and axially outward from the first differential bearing 30. The first differential bearing 30 can be positioned radially inward from the actuator 12 and radially inward from reducing gear set 20.

Figure 3:
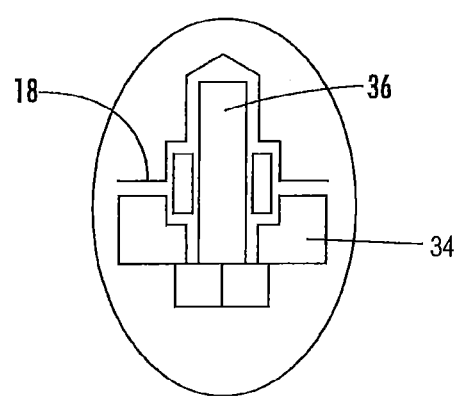
FIG. 3 is a detailed section view of a locating feature of the integrated active limited slip differential system of FIG. 1.

A bearing cap 34 is located radially outward from the first differential bearing 30. The bearing cap 34 may have at least one locating feature 36 including, but not limited to, a hollow dowel, as shown in FIG. 3. The hollow dowel 36 accurately locates the bearing cap 34 to the differential housing 18. The bearing cap 34 is fixedly but removably coupled to the differential housing 18. The bearing cap 34 can be attached to the differential housing 18 by a plurality of fasteners including, but not limited to, bolts. The hollow dowel 36 allows the bearing cap 34 to be removed from the differential housing 18 to permit assembly of the system 10 and then to be accurately repositioned.

Figure 2:
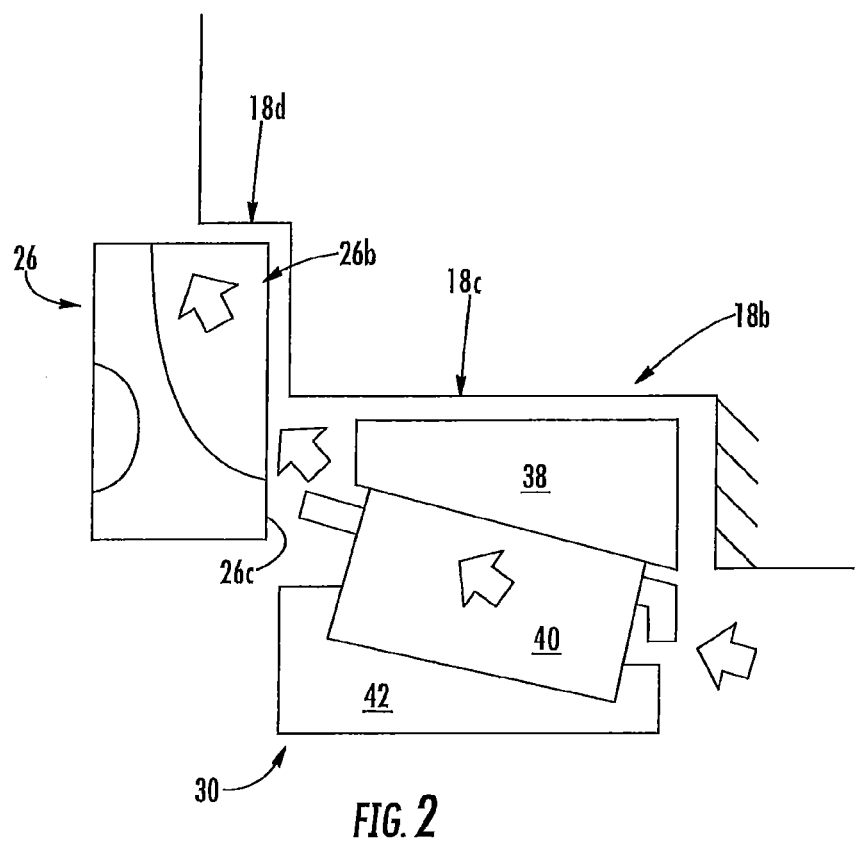
FIG. 2 is a detailed section view of a reaction member and bearing of the integrated active limited slip differential system of FIG. 1.

As shown in FIG. 2, the first differential bearing 30 can include an outer race 38, a roller 40, such as a tapered roller, and an inner race 42. The outer race 38 is located directly radially outward from a machined surface 18b on the differential housing 18. The first differential bearing 30 is provided in a first groove or bearing groove 18c in the differential housing 18. More particularly, the bearing inner race 42 is located directly radially and axially adjacent the differential case 32 and can be mounted on trunnions formed on the differential case 32. The bearing outer race 38 is located within the differential housing 18. The bearing outer race 38 can also be located within a bore in the bearing cap 34.

The reaction member 26 is located directly axially adjacent the first differential bearing 30. As shown in the FIG. 2, a second groove or reaction member groove 18d is provided in the differential housing 18. The reaction member groove 18d is directly axially adjacent the bearing groove 18c. The reaction member groove 18d may be located radially outward from the differential case 32 more than the bearing groove 18c.

Lubricant flows axially through the first differential bearing 30, such as through the roller 40. Additionally, a channel 26b may be located in a radially inner surface 26c of the reaction member 26, as shown in FIG. 2. Preferably, there is a plurality of circumferentially spaced channels about the radially inner surface 26c of the reaction member 26 for lubricant to pass through. The lubricant can flow axially and radially outward through the first differential bearing 30 into the reaction member channel 26b. The channels 26b allow the lubricant to flow to provide additional lubricant from the first differential bearing 30 to reaction member 26.

The thrust bearing 44 is located directly axially adjacent the actuating ring 22. More particularly, a first side 44a of the thrust bearing 44 is located axially opposite the second set of circumferentially extending grooves on the actuating ring 22. A second side 44b of the thrust bearing 44 is located adjacent an outer surface 32c of the differential case 32. Thus, the thrust bearing 44 is located entirely outside of the differential case 32. In one embodiment, the thrust bearing 44 is located axially between the actuating ring 22 and the differential case 32

The thrust bearing 44 facilitates rotation between the reaction member 26 and the differential case 32. In addition, the thrust bearing 44 transfers axial thrust provided from the ball and ramp assembly 24 to the thrust member 46. The thrust member 46 is provided in direct axial contact with the second side 44b of the thrust bearing 44. The thrust member extends through the differential case 32. The thrust member 46 may extend through the differential case 32 in a single location, or in a plurality of locations.

In one embodiment, the thrust member 46 is at least one thrust pin. In another embodiment, the thrust member 46 is a plunger including a ring with a plurality of fingers that extend axially on one side of the ring through the differential case 32.

When the ball and ramp assembly 24 expands, the actuating ring 22 applies a force to the thrust bearing 44 located adjacent thereto. The force applied to the thrust bearing 44 is used to load the friction clutch assembly 48. As the ball and ramp assembly 24 expands to axially displace the reaction member 26, the force reacts through the thrust member 46 and ultimately to the friction clutch assembly 48.

The thrust member 46 directly and axially abuts the friction clutch assembly 48 disposed within the differential case 32. In one embodiment, as depicted in FIG. 1, the friction clutch assembly 48 includes a clutch pack 49 having interleaved friction plates 48a, 48b. The first set of clutch plates 48a are fixed for rotation with the differential case 32 and connected to the differential case 32 for respective axial movement. A second set of plates 48b extends from and is connected to a first axle half shaft 50 or a trunnion of side gear 58. The second set of clutch plates 48b are fixed for rotation with the first axle half shaft 50. Springs (not shown) such as, but not limited to, wave springs can be placed between the two outer plates of the friction clutch assembly 48 or between each outer or inner plate to ensure the thrust bearing 44 and the ball and ramp assembly 24 have seating force.

The differential case 32 also houses a differential gear set 53 including a set of differential pinion gears 54 rotatably supported on a spider shaft 55 secured to the differential case 32. The differential pinion gears 54 are located opposite one another in the differential case 32. In the depicted embodiment, two differential pinion gears 54 are shown; however, it is understood that the system 10 may be configured for use with a greater number of differential pinion gears 54. The differential pinion gears 54 engage a pair of opposite side gears 58, 60. The side gears 58, 60 are adapted to rotate about an axis shared with the first axle half shaft 50 and the second axle half shaft 52. The first axle half shaft 50 is connected to a first of the side gears 58 and the second axle half shaft 52 is connected to a second of the side gears 60.

In the depicted embodiment, the friction clutch assembly 48 is on one side of the differential gear set 53. However, the friction clutch assembly 48 can be located on the opposite side of the differential gear set 53.

A ring gear 62 is connected to an outside surface of the differential case 32. The ring gear 62 may be integrally formed with the differential case 32, welded to the differential case 32, or it may be secured to the differential case 32 with a plurality of fasteners. It can be appreciated that the connection of the ring gear 62 and the differential case 32 results in rotation of the differential case 32. The ring gear 62 may be a bevel or helical type gear that is meshed with a complementary gear, such as a drive pinion (not shown).

A second differential bearing 64 is located between the differential case 32 and the differential housing 18. The second differential bearing 64 may be lubricated in the same way as the first differential bearing 30. The differential case 32 is mounted on bearings 30, 64 to support rotation within the differential housing 18.

The system 10 has two modes of operation. In a first mode, the disengaged mode, the ball and ramp assembly 24 has not been engaged, so axial pressure is not being exerted on the friction clutch assembly 48 from the thrust bearing 44 and the thrust member 46. In this condition, the interleaved clutch plates 48a, 48b are free to rotate with respect to one another. In other words, the system 10 will provide differentiating action between the two axle half shafts 50, 52. The disengaged mode might be appropriate for regular driving conditions where it might be preferred for the axle half shafts 50, 52 to occasionally need to rotate at different rates with respect to one another.

A second mode of operation may be initiated by the actuator 12 rotating the output shaft 14 a predetermined amount. The output shaft 14 rotates the first gear 16, which rotates the first reducing gear 20a, the second reducing gear 20c, the third reducing gear 20d and the actuating ring 22. The rotating actuating ring 22 results in the axial movement of the ring 22 toward the thrust bearing 44. The actuating ring 22 biases the thrust bearing 44 in the axial direction, which in turn biases the thrust member 46 in the axial direction. The thrust member 46, or a part thereof, extends through the differential case 32 and compresses the interleaved plates 48a, 48b into frictional engagement with one another, causing them to lock together. The thrust load provided through the first set of clutch plates 48a into the differential case 32 is reacted against the second differential bearing 64 to eliminate the need for an additional thrust bearing 44.

The second set of clutch plates 48b, connected with the first axle half shaft 50, are locked with the first set of clutch plates 48a, connected to the differential gear set 53, where the differential gear set 53 is connected to the second axle half shaft 52. Thus, the two axle half shafts 50, 52 are effectively locked together for providing equal rotation to the attached wheels (not shown).

The actuator 12 may be controlled by an electronic control unit (not shown). The control is carried out by judging motor vehicle running conditions according to at least one vehicle parameter including, but not limited to, wheel speeds. The system 10 is, thus, provided with a limited slip function, which allows torque to be directed to the wheel assembly having a greater amount of traction.

The second mode of operation is limited slip or fully locked mode. In addition to transferring torque to the wheel with most traction this mode might be used where the motor vehicle fitted with the system 10 is being used to tow, or pull, a load. Under these conditions, the locked differential mode can be used to resist or prevent a difference in wheel speed when the motor vehicle is being driven in a straight path to minimize the onset of undesirable vehicle yaw as a result of an uneven towed load. A motor brake can be added to the actuator 12 to reduce motor current where sustained use of the second mode is required.

In accordance with the provisions of the patent statutes, the present invention has been described in what is considered to represent its preferred embodiments. However, it should be noted that the invention can be practiced otherwise than as specifically illustrated and described without departing from its spirit or scope.

We claim:

1. A limited slip differential system, comprising:
a differential housing;
a differential case that rotates within the differential housing;
a differential gear set supported within the differential case and connected to two axle half shafts;
a friction clutch assembly including a clutch pack positioned within the differential case and axially adjacent the differential gear set;
a ball and ramp assembly positioned outside the differential case comprising a reaction member, an actuating ring, and a plurality of balls positioned between the reaction member and actuating ring, wherein the reaction member is positioned within and fixed to the differential housing and includes at least one channel in a radially inner surface thereof for lubricant to flow through;
a differential bearing is positioned axially between the reaction member and the differential housing and radially outward from the differential case;
a thrust bearing located within the differential housing and outside the differential case axially adjacent the actuating ring; and
a thrust member in direct contact with the thrust bearing, wherein at least a portion of the thrust member extends through the differential case and axially abuts the clutch pack.

2. The limited slip differential system of claim 1, wherein the thrust bearing is located directly axially adjacent the actuating ring and adjacent an outer surface of the differential case.

3. The limited slip differential system of claim 1, wherein an inner race of the differential bearing is positioned radially and axially adjacent the differential case.

4. The limited slip differential of claim 1, wherein the friction clutch assembly is located within the differential case and the clutch pack comprises a first set of clutch plates and a second set of clutch plates, wherein the first set of clutch plates is connected to the differential case and the second set of clutch plates is connected to one of the first and second axle half shafts within the differential case and the first and second set of clutch plates are interleaved.

5. The limited slip differential system of claim 1, further comprising a bearing cap located radially outward from the differential bearing.

6. The limited slip differential system of claim 5, wherein the bearing cap comprises at least one locating feature to removably fix the bearing cap to the differential housing.

7. The limited slip differential system of claim 6, wherein the locating feature is a hollow dowel.

8. The limited slip differential system of claim 1, further comprising a reducing gear set drivingly connected to the ball and ramp actuator assembly and an actuator.

9. The limited slip differential system of claim 8, wherein the actuator is a reversible electric motor.

10. The limited slip differential system of claim 8, wherein the actuator further comprises a motor brake.

11. The limited slip differential system of claim 8, wherein the actuator is mounted directly to the differential housing.

12. The limited slip differential system of claim 8, further comprising an electronic control unit.

13. The limited slip differential system of claim 1, wherein the differential bearing is positioned in a first groove in the differential housing.

14. The limited slip differential system of claim 13, wherein the reactor member is positioned in a second groove in the differential housing axially adjacent and radially outboard from the first groove in the differential housing.

* * * * *